(12) United States Patent
Matsumura et al.

(10) Patent No.: US 9,018,265 B2
(45) Date of Patent: Apr. 28, 2015

(54) DEFOAMING AGENT

(75) Inventors: Yohei Matsumura, Kyoto (JP); Nobuo Hisada, Kyoto (JP); Yoshihide Izumi, Kyoto (JP)

(73) Assignee: San Nopco Ltd., Kyoto-shi (JP)

(*) Notice: Subject to any disclaimer, the term of this patent is extended or adjusted under 35 U.S.C. 154(b) by 817 days.

(21) Appl. No.: 13/146,735

(22) PCT Filed: Jan. 29, 2010

(86) PCT No.: PCT/JP2010/000538
§ 371 (c)(1),
(2), (4) Date: Jul. 28, 2011

(87) PCT Pub. No.: WO2010/087196
PCT Pub. Date: Aug. 5, 2010

(65) Prior Publication Data
US 2011/0281985 A1    Nov. 17, 2011

(30) Foreign Application Priority Data

Feb. 2, 2009   (JP) .................................. 2009-022035

(51) Int. Cl.
*B01D 19/04*    (2006.01)
*C09D 7/12*     (2006.01)
*C09D 201/00*   (2006.01)
*C09D 5/02*     (2006.01)
*C09D 7/00*     (2006.01)
*D21H 21/12*    (2006.01)
*C08K 5/09*     (2006.01)
*C08K 5/20*     (2006.01)
*D21H 19/44*    (2006.01)

(52) U.S. Cl.
CPC ........ *B01D 19/0413* (2013.01); *B01D 19/0404* (2013.01); *C08K 5/09* (2013.01); *C08K 5/20* (2013.01); *C09D 5/024* (2013.01); *C09D 7/002* (2013.01); *C09D 7/1233* (2013.01); *D21H 19/44* (2013.01); *D21H 21/12* (2013.01)

(58) Field of Classification Search
CPC .............. B01D 19/04; B01D 19/0413; B01D 19/0495; B01D 19/0404; B01B 1/04; D21H 21/12; D21C 3/28
USPC ............................ 516/116, 130, 131; 524/230
See application file for complete search history.

(56) References Cited

U.S. PATENT DOCUMENTS

| 3,159,575 A * | 12/1964 | Criddle ................... 508/175 |
| 3,652,453 A | 3/1972 | MacDonnell |
| 3,655,594 A * | 4/1972 | Medica et al. ................... 524/28 |
| 3,676,408 A * | 7/1972 | Schultz et al. ................. 526/332 |
| 4,021,365 A * | 5/1977 | Sinka et al. ..................... 516/116 |
| 4,225,456 A | 9/1980 | Schmidt et al. |
| 4,767,568 A | 8/1988 | Abel et al. |
| 4,880,564 A | 11/1989 | Abel et al. |
| 6,579,908 B1 * | 6/2003 | Penny et al. ................... 516/118 |
| 2006/0111453 A1 | 5/2006 | Bonn et al. |

FOREIGN PATENT DOCUMENTS

| EP | 0048094 A1 | 3/1982 |
| GB | 1464121 A | 2/1977 |
| GB | 2 155 004 A | 9/1985 |
| JP | 60-209213 A | 10/1985 |
| JP | 63-091106 A | 4/1988 |
| JP | 2002-143606 A | 5/2002 |
| JP | 2004-098021 A | 4/2004 |
| JP | 2005-313039 A | 11/2005 |

OTHER PUBLICATIONS

CRC Handbook of Chemistry and Physics, 1981-1982 62nd Edition, Edited by Weast et al., CRC Press, Inc, Boca Raton, Florida, USA, pp. F-40 and F-41 (1981).*
Lewis, Richard J., Sr. (2002) Hawley's Condensed Chemical Dictionary (14th Edition), John Wiley & Sons, Online @ http://app.knovel.com/web/toc.v/cid:kpHCCDE006/viewerType:toc/root_slug:hawleys-condensed-chemical/url_slug:hawleys-condensed-chemical/?, headword = paint, emulsion, (Knovel Release Date: Sep. 4, 2003; downloaded Mar. 15, 2014, 2013), pp. 1.*
Japanese Office Action dated Jan. 18, 2011, issued in corresponding Japanese Patent Application No. 2010-538257.
Supplementary European Search Report issued for 10735668.5, mailing date of Aug. 21, 2012.
Notification of Transmittal of Translation of the International Preliminary Report on Patentability (Form PCT/IB/338) of International Application No. PCT/JP2010/000538 mailed Aug. 18, 2011 with forms PCT/IB/373 and PCT/ISA/237.
Chinese Office Action dated May 6, 2013, issued in corresponding Chinese Patent Application No. 201080006355.1, w/ English translation.

* cited by examiner

*Primary Examiner* — Daniel S Metzmaier
(74) *Attorney, Agent, or Firm* — Westerman, Hattori, Daniels & Adrian, LLP

(57) ABSTRACT

The present invention is a defoaming agent comprising a fatty acid amide (A), a base oil (B) that is liquid at 25° C., an oil thickening agent (C), and a surfactant (D), wherein the content of the fatty acid amide (A) is 1 to 10% by weight, the content of the base oil (B) that is liquid at 25° C. is 71 to 97.9% by weight, the content of the oil thickening agent (C) is 0.1 to 10% by weight, and the content of the surfactant (D) is 1 to 9% by weight based on the weight of the fatty acid amide (A), the base oil (B) that is liquid at 25° C., the oil thickening agent (C), and the surfactant (D), and the viscosity (25° C.) at a shear rate of 1000 $s^{-1}$ is 0.1 to 1.0 Pa·s.

11 Claims, No Drawings

DEFOAMING AGENT

TECHNICAL FIELD

The present invention relates to defoaming agents. Particularly, it relates to defoaming agents suited for foams that generate during various steps of industries in which various aqueous foamable solutions are handled, such as the paper pulp manufacturing industry or its paper making step, the construction industry or its sheet making step, the dyestuff industry, the dyeing industry, the fermentation industry, the synthetic resin manufacturing industry, the synthetic rubber manufacturing industry, ink, the paint industry, and the fiber processing industry.

BACKGROUND ART

There have been known a antifoam agent comprising an alkaline earth metal salt of a fatty acid, a dialkyl ester of an unsaturated dicarboxylic acid, a mineral oil, a non-ionic emulsifier, an anion emulsifier, and alkylenediamide (patent document 1), and a defoaming agent composition comprising a base oil composed of a liquid hydrocarbon oil, an amide derivative of a fatty acid, and a metallic soap (patent document 2).

PRIOR ART DOCUMENTS

Patent Documents

[Patent Document 1]
JP 63-91106 A (corresponding to U.S. Pat. No. 4,880,564)
[Patent Document 2]
JP 2002-143606 A

DISCLOSURE OF THE INVENTION

Problems to be Solved by Invention

A sufficient defoaming property (foam-breaking, foam-inhibiting effect) cannot be obtained with the aforementioned antifoam agent and the antifoam agent is deactivated easily especially in a foamable liquid and, therefore, it is problematic as being poor in long-term defoaming property (defoaming durability).

On the other hand, the above-mentioned defoaming agent composition cannot offer a sufficient defoaming property (foam-breaking, foam-inhibiting effect) and also is problematic as being poor in handleability (solidification, separation, and so on).

An object of the present invention is to provide a defoaming agent that is superior in defoaming properties (foam-breaking, foam-inhibiting effect, defoaming durability) and also superior in handleability.

Means to Solve the Problems

The present inventor studied earnestly in order to solve the above-described problems and, as a result, has come to the present invention by finding that deactivation of a defoaming agent can be prevented by optimally controlling the viscosity of the defoaming agent at high shear rates. That is, the gist of the feature of the defoaming agent of the present invention lies in that the defoaming agent comprises a fatty acid amide (A), a base oil (B) that is liquid at 25° C., an oil thickening agent (C), and a surfactant (D), wherein the content of the fatty acid amide (A) is 1 to 10% by weight, the content of the base oil (B) that is liquid at 25° C. is 71 to 97.9% by weight, the content of the oil thickening agent (C) is 0.1 to 10% by weight, and the content of the surfactant (D) is 1 to 9% by weight based on the weight of the fatty acid amide (A), the base oil (B) that is liquid at 25° C., the oil thickening agent (C), and the surfactant (D), and the viscosity (25° C.) at a shear rate of $1000\ s^{-1}$ is 0.1 to 1.0 Pa·s.

The gist of the feature of the method of the present invention for producing a defoaming agent lies in that it is a method for producing the above-mentioned defoaming agent, which includes process (1) comprising step (1) of obtaining a solution by dissolving the fatty acid amide (A) while heating and stirring the fatty acid amide (A), a part of the base oil (B) that is liquid at 25° C., the oil thickening agent (C), and the surfactant (D), step (2) of obtaining a mixture by charging the solution to the rest of the base oil (B) that is liquid at 25° C. while stirring the base oil, and step (3) of obtaining the defoaming agent by subjecting the mixture to fining treatment (homogenizing treatment);

process (2) comprising step (4) of obtaining a solution by dissolving the fatty acid amide (A) while heating and stirring the fatty acid amide (A), the base oil (B) that is liquid at 25° C., the oil thickening agent (C), the surfactant (D), and water (E), and step (5) of obtaining the defoaming agent by subjecting the solution to fining treatment (homogenizing treatment) at 40° C. or lower after cooling and stirring the solution;

process (3) comprising step (6) of obtaining a solution by dissolving the fatty acid amide (A) while heating and stirring the fatty acid amide (A), the base oil (B) that is liquid at 25° C., the oil thickening agent (C), and the surfactant (D), step (7) of obtaining a mixture by charging the solution to the water (E) while stirring the water, and step (8) of obtaining the defoaming agent by subjecting the mixture to fining treatment (homogenizing treatment);

process (4) comprising step (9) of obtaining a solution by dissolving the fatty acid amide (A) while heating and stirring the fatty acid amide (A), the base oil (B) that is liquid at 25° C., the oil thickening agent (C), and the surfactant (D), and step (10) of obtaining the defoaming agent by subjecting the solution to fining treatment (homogenizing treatment) at 40° C. or lower after cooling and stirring the solution; or process (5) comprising step (11) of obtaining a solution by dissolving the fatty acid amide (A) while heating and stirring the fatty acid amide (A), the base oil (B) that is liquid at 25° C., the oil thickening agent (C), the surfactant (D), and a part of the water (E), step (12) of obtaining a mixture by charging the solution to the rest of the water (E) while stirring the water, and step (13) of obtaining the defoaming agent by subjecting the mixture to fining treatment (homogenizing treatment).

The gist of the feature of water-based paint of the present invention lies in that the paint comprises a resin emulsion, a pigment, an aqueous medium, and the aforementioned defoaming agent.

Advantages of the Invention

The defoaming agent of the present invention demonstrates excellent defoaming properties (foam-breaking, foam-inhibiting effect, defoaming durability). Moreover, the defoaming agent of the present invention can inhibit the generation of repelling or cratering even if it is used for various processes such as the paper pulp manufacturing industry or its papermaking step, the construction industry or its sheet making step, the dyestuff industry, the dyeing industry, the fermentation industry, the synthetic resin manufacturing industry, the synthetic rubber manufacturing industry, ink, the paint industry, and the fiber processing industry, and almost no lowering of defoaming property is recognized even after a lapse of a long time after its addition to a foamable liquid under consideration.

By the method of the present invention for producing a defoaming agent, a defoaming agent excellent in defoaming properties (foam-breaking, foam-inhibiting effect, defoaming durability) can be produced.

The water-based paint of the present invention continues to demonstrate good defoaming property for a long period of time because it contains the above-mentioned defoaming agent.

MODE FOR CARRYING OUT THE INVENTION

In the present invention, "registered trademark" means having been registered in Japan.

In the present invention, "(meth)acryl . . . " means "acryl . . . " or "methacryl . . . . "

The fatty acid amide (A) includes a reaction product (fatty acid diamide) (A1) of an alkylenediamine having 1 to 6 carbon atoms or an alkenylenediamine with a fatty acid having 10 to 22 carbon atoms and/or a reaction product (fatty acid monoamide) (A2) of an alkylamine having 1 to 22 carbon atoms, an alkenylamine having 1 to 22 carbon atoms, or ammonia with a fatty acid having 10 to 22 carbon atoms.

Examples of the fatty acid diamide (A1) include ethylene bis-stearylamide, ethylene bis-palmitylamide, ethylene bis-myristylamide, ethylene bis-laurylamide, ethylene bis-oleylamide, propylene bis-stearylamide, propylene bis-palmitylamide, propylene bis-myristylamide, propylene bis-laurylamide, propylene bis-oleylamide, butylene bis-stearylamide, butylene bis-palmitylamide, butylene bis-myristylamide, butylene bis-laurylamide, butylene bis-oleylamide, methylene bis-laurylamide, methylene bis-stearylamide, and hexamethylene bis-stearylamide.

Examples of the fatty acid monoamide (A2) include N-stearylstearylamide, oleamide, erucamide, and stearylamide.

Among these, the fatty acid diamide (A1) is preferred from the viewpoint of defoaming property, and so on. More preferred are ethylene bis-stearylamide, ethylene bis-palmitylamide, ethylene bis-laurylamide, methylene bis-stearylamide, and hexamethylene bis-stearylamide, and particularly preferred are ethylene bis-stearylamide, ethylene bis-palmitylamide, and ethylene bis-myristylamide. These amides may be in the form of a mixture of two or more members, and in the case of a mixture, it is preferred that any of the aforementioned preferable members be contained as a primary component.

A primary component means a component that is contained in at least 40% by weight based on the weight of the fatty acid amide (A) and it is contained preferably in 50% by weight or more, more preferably in 60% by weight or more, particularly preferably in 70% by weight or more, and most preferably in 80% by weight or more.

As secondary components (components contained in addition to the primary component) in the fatty acid amide (A) include an unreacted amine, a monoamide, an unreacted carboxylic acid, and so on as well as amides other than the amides within the aforementioned preferable range. The content (% by weight) of the secondary components is preferably less than 60, more preferably less than 50, particularly preferably less than 40, more preferably less than 30, and most preferably less than 20.

The base oil (B) that is liquid at 25° C. is not particularly limited if it is one that is liquid at 25° C. and can dissolve the fatty acid amide (A) when being heated, and it includes mineral oils, isoparaffin oils, fatty oils, polyoxypropylene glycol, polyoxybutylene glycol, and higher alcohols.

The mineral oils include mineral oils having a kinematic viscosity at 40° C. of 5 to 40 $mm^2/s$, and their exemplary commercial names include COSMO PURESPIN G, COSMO PURESPIN E, COSMO SP-10, COSMO SP-32, COSMO SC22 (COSMO OIL CO., LTD., "COSMO" and "PURESPIN" are registered trademarks of this company), and Stanol 40 (Exxon Mobil Corporation).

The isoparaffin oils include isoparaffin oils having a kinematic viscosity at 25° C. of 1 to 20 $mm^2/s$, and their exemplary commercial names include NAS-5H (NOF Corporation).

The fatty oils include esters made up of fatty acids having 6 to 22 carbon atoms or their mixtures and glycerol, including vegetable oils (their exemplary commercial names include FINE OIL N, FINE OIL LR-1, FINE OIL ISB-12; Miyoshi Oil & Fat Co., Ltd.), and medium-chain fatty acid glycerides (their exemplary commercial names include PANACET 875; NOF Corporation, wherein "PANACET" is a registered trademark of this company).

The polyoxypropylene glycol includes polyoxypropylene glycols having a number average molecular weight of 200 to 6000.

The polyoxybutylene glycol includes polyoxybutylene glycols having a number average molecular weight of 200 to 8000.

The higher alcohols include higher alcohols having 6 to 22 carbon atoms and their exemplary commercial names include OXOCOL C13 (Kyowa Hakko Chemical Co., Ltd., "OXOCOL" is a registered trademark of Kyowa Hakko Chemical Co., Ltd.) and RIKACOL 110BJ (New Japan Chemical Co., Ltd., "RIKACOL" is a registered trademark of this company).

Among these base oils (B), mineral oils and fatty oils (vegetable oils) are preferred, and mineral oils, especially mineral oils having a kinematic viscosity at 25° C. of 5 to 40 $mm^2/s$ are preferred.

Any substance capable of thickening the base oil (B) can be used as the oil thickening agent (C) without any limitations, and metallic soaps, hydroxycarboxylic acids, amino acid gelatinizers, polyglycerol fatty acid esters, (modified) polyalkylene waxes, and alkyl (meth)acrylate copolymers are included.

The metallic soaps include salts of fatty acids having 12 to 22 carbon atoms with metals (alkaline earth metals, aluminum, manganese, cobalt, lead, chromium, copper, iron, nickel, etc.), and specifically aluminum stearate, calcium stearate, zinc laurate, and magnesium behenate.

The hydroxycarboxylic acids include hydroxycarboxylic acids having 16 to 22 carbon atoms, and specifically hydroxystearic acid (its exemplary commercial names include 12-Hydroacid; Kokura Synthetic Industries, Ltd.).

Examples of the amino acid gelatinizers include mono- or di-esters of N-acyl acidic amino acids and mono- or di-(alkyl) amides of N-acyl acidic amino acids, and specifically N-lauroylglutamic acid dibutylamide (its exemplary commercial names include GP-1; Ajinomoto Co., Inc.), and dibehenyl N-2-ethylhexanoylglutamic acid.

Examples of the polyglyceryl fatty acid esters include esters made up of polyglycerols having a degree of polymerization of 2 to 10 and fatty acids having 12 to 22 carbon atoms, and their exemplary commercial names include RYOTO POLYGLYESTER B-70D and B-100D; Mitsubishi-Kagaku Foods Corporation, "RYOTO" is a registered trademark of Mitsubishi Chemical Corporation.

Examples of the (modified) polyalkylene waxes include polyethylene and polypropylene waxes modified by air oxidation, maleic acid modification, styrene modification, or the like, and specifically oxidized polyethylene waxes (their exemplary commercial names include EPOLENE E-10J wax; Eastman Chemical Japan, Inc.), and low-molecular-weight polyethylene waxes (their exemplary commercial names include SANWAX 131P, 151P, 161P, 165P, 171P; all available from Sanyo Chemical Industries, Ltd., "SANWAX" is a registered trademark of this company).

Examples of the alkyl (meth)acrylate copolymers include copolymers having a number average molecular weight of 10000 to 500000 made up of an alkyl (meth)acrylate having alkyl group having 1 to 24 carbon atom, and their exemplary commercial names include SANELIS 702, 823, 934 and 133 (all available from Sanyo Chemical Industries, Ltd. "SANELIS" is a registered trademark of this company).

Among these, metallic soaps are preferred, and aluminum stearate, calcium stearate, magnesium stearate, zinc laurate, and zinc behenate are more preferred.

The surfactant (D) includes anionic surfactants, nonionic surfactants, and their mixtures.

The nonionic surfactants include sorbitan fatty acid esters, ethylene oxide adducts of sorbitan fatty acid esters, polyoxyethylene polyoxypropylene block polymer, polyoxyethylene alkyl aryl ether, ethylene oxide adducts of vegetable oils, fatty acid esters of polyoxyethylene, polyoxyethylene alkyl ether, glycerol aliphatic acid esters and ethylene oxide adducts of glycerol aliphatic acid esters.

The HLB of a nonion surfactant is preferably 2 to 20, more preferably 2.5 to 19, particularly preferably 3 to 18, and most preferably 3.5 to 17. An HLB is determined by the method disclosed in "Shin Kaimenkasseizai Nyumon" (Takehiko Fujimoto, published by Sanyo Chemical Industries, Ltd.), pp. 128-131 [English version: New Introduction to Surface Active Agents (T. Fujimoto, SANYO CHEMICAL INDUSTRIES, LTD., pp. 128-131)].

The sorbitan fatty acid esters include esters of sorbitan and fatty acids having 12 to 22 carbon atoms, specifically, sorbitan monolaurate (HLB 8.6, e.g., NONION LP-20R; NOF Corporation), sorbitan monopalmitate (HLB 6.7, e.g., NONION PP-40R pellet; NOF Corporation), Sorbitan monostearate (HLB 4.7, e.g., NONION SP-60R pellet; NOF Corporation), Sorbitan monooleate (HLB 4.3, e.g., NONION OP-80R; NOF Corporation), Sorbitan trioleate (HLB 1.8, e.g., NONION OP-85R; NOF Corporation), and Sorbitan monooleate (HLB 4.3, e.g., IONET S-80; Sanyo Chemical Industries, Ltd.; "IONET" is a registered trademark of this company).

The ethylene oxide adducts of sorbitan fatty acid esters include ethylene oxide (1-40 mol) adducts of sorbitan fatty acid esters, specifically polyoxyethylene sorbitan monolaurate (HLB 16.7, e.g., NONION LT-221; NOF Corporation), polyoxyethylene sorbitan monostearate (HLB 15.7, e.g., NONION ST-221; NOF Corporation), and polyoxyethylene sorbitan monooleate (HLB 15.7, e.g., NONION OT-221; NOF Corporation).

The polyoxyethylene polyoxypropylene block polymers include copolymers of 5 to 200 mol of ethylene oxide with 5 to 200 mol of propylene oxide, specifically a polyoxyethylene (25 mol)-polyoxypropylene (30 mol) block polymer (e.g., NEWPOL PE-64; Sanyo Chemical Industries, Ltd.; "NEWPOL" is a registered trademark of this company) and a polyoxyethylene (48 mol)-polyoxypropylene (35 mol) block polymer (e.g., NEWPOL PE-75; Sanyo Chemical Industries, Ltd.).

The polyoxyethylene alkyl aryl ethers include polyoxyethylene ethers of alkylaryls having an alkyl group having 6 to 18 carbon atoms, specifically a polyoxyethylene (4 mol)-nonyl phenol ether (e.g., NONIPOL 40; Sanyo Chemical Industries, Ltd.; "NONIPOL" is a registered trademark of this company) and a polyoxyethylene (10 mol)-nonyl phenol ether (e.g., NONIPOL 100; Sanyo Chemical Industries, Ltd.).

The ethylene oxide adducts of vegetable oils include ethylene oxide (1 to 200 mol) adducts of vegetable oils, specifically an ethylene oxide adduct of castor oil (e.g., UNIOX HC-40; NOF Corporation; "UNIOX" is a registered trademark of this company).

The fatty acid esters of polyoxyethylene include monoesters and diesters of polyoxyethylene having a number average molecular weight of 200 to 4000 with a fatty acid having 6 to 22 carbon atoms, and specifically include diesters of polyoxyethylene glycol having a number average molecular weight of 600 with oleic acid (e.g., IONET DO-600; Sanyo Chemical Industries, Ltd.) and monoesters of polyoxyethylene glycol having a number average molecular weight of 600 with oleic acid (e.g., IONET MO-600; Sanyo Chemical Industries, Ltd.).

The polyoxyethylene alkyl ethers include oxyethylene (1-100 mol) adducts of an alkanol having 6 to 22 carbon atoms, and specifically include NAROACTY CL-40 (HLB 8.9, Sanyo Chemical Industries, Ltd., "NAROACTY" is a registered trademark of this company) and NAROACTY CL-100 (HLB 13.3, Sanyo Chemical Industries, Ltd.).

The glycerol aliphatic acid esters include monoesters of a fatty acid having 6 to 22 carbon atoms with glycerol, and specifically include glycerol monostearate (e.g., MONOGLY MD, HLB 5.5, NOF Corporation).

The ethylene oxide adducts of glycerol aliphatic acid esters include ethylene oxide (1-100 mol) adducts of glycerol aliphatic acid esters, and specifically include an ethylene oxide adduct of glycerol palm-oil-fatty-acid ester (e.g., UNIGLY MK-207, HLB 13.0, NOF Corporation, and "UNIGLY" is a registered trademark of this company).

Among these, sorbitan fatty acid esters, ethylene oxide adducts of sorbitan fatty acid esters, polyoxyethylene alkyl ethers, glycerol aliphatic acid esters, and ethylene oxide adducts of glycerol aliphatic acid esters are preferred.

The anionic surfactant includes salts of alkylarylsulfonic acids, salts of alkyl biphenyl ether disulfonic acids, salts of polyoxyethylene alkyl sulfonic acid esters, and salts of polyoxyethylene alkyl phosphoric acid esters.

The salts of alkylarylsulfonic acids include salts of alkylarylsulfonic acids having 6 to 18 carbon atoms, including salts of dodecylbenzenesulfonic acid. The salts, which are not particularly limited, include salts of alkali metal (e.g., sodium and potassium), salts of alkaline earth metal (e.g., calcium and magnesium), ammonium salts, and salts of amines having 1 to 18 carbon atoms (e.g., triethanolamine, trimethylamine, and propylamine) (the same is applied also hereinafter).

The salts of alkyl diphenyl ether sulfonic acids include salts of alkyl diphenyl ether disulfonic acids having an alkyl group having 6 to 18 carbon atoms, including salts of dodecyl diphenyl ether disulfonic acid.

The salts of polyoxyethylene alkyl sulfonic acid esters include salts of polyoxyethylene alkyl sulfonic acid esters having 6 to 22 carbon atoms, including salts of polyoxyethylene lauryl sulfonic acid ester.

The salts of polyoxyethylene alkyl phosphoric acid esters include polyoxyethylene alkyl phosphoric acid esters having 6 to 22 carbon atoms, including salts of polyoxyethylene stearyl phosphoric acid ester.

Among these, the salts of alkylarylsulfonic acids and the salts of alkyl diphenyl ether disulfonic acids are preferred, salts of dodecylbenzenesulfonic acid and salts of dodecyldiphenyl ether disulfonic acid are more preferred, and calcium dodecylbenzenesulfonate and calcium dodecyldiphenyl ether disulfonate are particularly preferred.

The viscosity (25° C., Pa·s) of the defoaming agent of the present invention at a shear rate of 1000 $s^{-1}$ is 0.1 to 1.0, preferably 0.1 to 0.9, more preferably 0.1 to 0.85, and particularly preferably 0.15 to 0.82. When the viscosity is within such ranges, the defoaming property is further improved. It is conceivable that this is because good particle form retainability (property that particles retain their form and hardly become fine particles or hardly become soluble) is demonstrated, so that the defoaming property will become hard to be lost due to fine particle formation and solubilization.

The viscosity (25° C., Pa·s) at a shear rate of 1000 $s^{-1}$ is determined by measuring a viscosity while increasing the shear rate from 0.1 $s^{-1}$ to 1000 $s^{-1}$ over 300 seconds using a cone-plate viscometer (for example, a viscoelasticity analyzer MCR-310 manufactured by ANTONPAAR, cone plate (CP25-2; plate diameter: 25 mm, cone angle: 2°)), and reading a viscosity at a shear rate of 1000 $s^{-1}$.

The viscosity (25° C., Pa·s) of the defoaming agent of the present invention at a shear rate of 1000 $s^{-1}$ can be adjusted by the content of the fatty acid amide (A) and the contents of the base oil (B) that is liquid at 25° C., the oil thickening agent (C), and the surfactant (D).

There is a tendency that the viscosity at a shear rate of 1000 $s^{-1}$ increases as the contents of the fatty acid amide (A) and the oil thickening agent (C) increase, whereas the viscosity at a shear rate of 1000 $s^{-1}$ tends to decrease as the contents of the base oil (B) that is liquid at 25° C. and the surfactant (D) increase.

In order to bring the viscosity of the defoaming agent of the present invention at a shear rate of 1000 $s^{-1}$ into the above-mentioned ranges, it is preferred to adjust the contents of the fatty acid amide (A), the base oil (B) that is liquid at 25° C., the oil thickening agent (C), and the surfactant (D) to within the following ranges.

The contents (% by weight) of the fatty acid amide (A) is 1 to 10 based on the weight of the fatty acid amide (A), the base oil (B) that is liquid at 25° C., the oil thickening agent (C), and the surfactant (D), preferably 1.5 to 9.5, more preferably 2 to 9, particularly preferably 2.5 to 8.5, and most preferably 3 to 8.

The contents (% by weight) of the base oil (B) that is liquid at 25° C. is 71 to 97.9 based on the weight of the fatty acid amide (A), the base oil (B) that is liquid at 25° C., the oil thickening agent (C), and the surfactant (D), preferably 73 to 97, more preferably 75 to 95.5, particularly preferably 77 to 94, and most preferably 80 to 92.7.

The contents (% by weight) of the oil thickening agent (C) is 0.1 to 10 based on the weight of the fatty acid amide (A), the base oil (B) that is liquid at 25° C., the oil thickening agent (C), and the surfactant (D), preferably 0.2 to 9.5, more preferably 0.3 to 9, particularly preferably 0.3 to 8.5, and most preferably 0.4 to 8.

The contents (% by weight) of the surfactant (D) is 1 to 9 based on the weight of the fatty acid amide (A), the base oil (B) that is liquid at 25° C., the oil thickening agent (C), and the surfactant (D), preferably 1.2 to 8.5, more preferably 1.4 to 8, particularly preferably 1.6 to 7.5, and most preferably 1.8 to 7.

The viscosity (25° C., Pa·s) of the defoaming agent of the present invention at a shear rate of 10 $s^{-1}$ is preferably 0.1 to 10, more preferably 0.15 to 8, particularly preferably 0.2 to 6, and most preferably 0.25 to 4. When the viscosity is within such ranges, the defoaming nature is further improved.

As done for the viscosity at 1000 $s^{-1}$, the viscosity (25° C., Pa·s) at a shear rate of 10 $s^{-1}$ is determined by measuring a viscosity while increasing the shear rate from 0.1 $s^{-1}$ to 1000 $s^{-1}$ over 300 seconds using a cone-plate viscometer, and reading a viscosity at a shear rate of 10 $s^{-1}$.

The defoaming agent of the present invention can contain water (E), hydrophobic silica (F) and/or a polyether (G), and so on in addition to the fatty acid amide (A), the base oil (B) that is liquid at 25° C., the oil thickening agent (C), and the surfactant (D).

Examples of the water (E) include tap water, industrial water, deionized water, and distilled water.

When the water (E) is contained, the contents (% by weight) of the water (E) is preferably 1 to 900 based on the weight of the fatty acid amide (A), the base oil (B) that is liquid at 25° C., the oil thickening agent (C), and the surfactant (D), more preferably 2 to 300, even more preferably 3 to 90, still more preferably 5 to 85, particularly preferably 10 to 80, and more preferably 20 to 80, and most preferably 25 to 75.

When the water (E) is contained, the aforementioned viscosity (25° C.) at a shear rate of 1000 $s^{-1}$ is the viscosity of the oil phase composed of the fatty acid amide (A), the base oil (B) that is liquid at 25° C., the oil thickening agent (C), and the surfactant (D). It is conceivable that this is because if the viscosity at a shear rate of 1000 $s^{-1}$ of a component contained in the oil phase that exhibits defoaming property is within the aforementioned range, good particle form retainability (property that particles retain their form and hardly become fine particles or hardly become soluble) is demonstrated, so that the defoaming property will become hard to be lost due to fine particle formation and solubilization.

When the water (E) is contained, the aforementioned viscosity (25° C.) at 1000 $s^{-1}$ is measured in the way described above after evaporating the water under reduced pressure (at 40° C. or lower (preferably about 0 to 40° C.), 7 kPa or lower (preferably about 0.1 to 1 kPa) or is measured in the way described above for an oil phase of a defoaming agent, the oil phase having been prepared in the same manner as that used in the case of containing water except for using no water.

When the water (E) is contained, the defoaming agent of the present invention may constitute an emulsion type defoaming agent containing the fatty acid amide (A), the base oil (B) that is liquid at 25° C., the oil thickening agent (C), and the surfactant (D) in the form of an oil phase. In this case, it may be either a W/O type or an O/W type.

The hydrophobic silica (F) includes hydrophobic silica prepared by hydrophobing a silica powder with a hydrophobing agent.

Exemplary commercial names of commercially available hydrophobic silica include Nipsil SS-10, SS-40, SS-50, and SS-100 (Tosoh Silica Corporation, "Nipsil" is a registered trademark of Tosoh Silica Corporation), AEROSIL R972, RX200, and RY200 (Nippon Aerosil Co., Ltd., "AEROSIL" is a registered trademark of Evonik Degussa GmbH), TS-530, TS-610, TS-720 (Cabot Carbon Corporation), AEROSIL R202, R805, and R812 (Degussa Japan Co., Ltd.), REOLOSIL MT-10, DM-10, and DM-20S (Tokuyama Corporation, "REOLOSIL" is a registered trademark of this company), and SYLOPHOBIC100, 702, 505 and 603 (Fuji Silysia Chemical Ltd., "SYLOPHOBIC" is a registered trademark of this company).

When the hydrophobic silica (F) is contained, the content (% by weight) of the hydrophobic silica (F) is preferably 0.1 to 6, more preferably 0.2 to 5.5, particularly preferably 0.3 to 5, and most preferably 0.4 to 4.5 based on the weight of the fatty acid amide (A), the base oil (B) that is liquid at 25° C., the oil thickening agent (C), and the surfactant (D).

Examples of the polyether (G) include reaction products of 1 mol of a monoalcohol having 1 to 22 carbon atoms, a monocarboxylic acid having 1 to 22 carbon atoms, or a monoamine having 1 to 22 carbon atoms with 1 to 100 mol of an alkylene oxide having 2 to 4 carbon atoms, and reaction products of 1 mol of a polyol having 2 to 6 carbon atoms with 1 to 300 mol of an alkylene oxide having 2 to 4 carbon atoms {polyether type defoaming agents; e.g., SN-Defoamer 180; SAN NOPCO Ltd.}. The HLB of the polyether (G) is preferably 0 to 3.4, more preferably 0 to 2.9, particularly preferably 0 to 2.4, and most preferably 0 to 1.9.

When the polyether (G) is contained, the content (% by weight) of the polyether (G) is preferably 0.1 to 55, more preferably 1 to 50, even more preferably 2 to 45, particularly preferably 3 to 40, and most preferably 5 to 35 based on the weight of the fatty acid amide (A), the base oil (B) that is liquid at 25° C., the oil thickening agent (C), and the surfactant (D).

The defoaming agent of the present invention may contain a conventional thickener, a conventional dispersing agent, a conventional antiseptic (Dictionary of Antibacterial and Antifungal Agents, 1st Ed., pp. 1-32, published by The Society for Antibacterial and Antifungal Agents, Japan, 1986), a conventional antifreezing agent and/or a solvent (Solvent Handbook, pp. 143-881, published by Kodansha, 1976).

Examples of the thickener include xanthan gum, locust bean gum, guar gum, carrageenan, alginic acid and a salt thereof, tragacanth gum, magnesium aluminum silicate, bentonite, synthetic hydrous silicic acid, and a synthetic macromolecule type thickener containing a carboxyl group (exemplary commercial names include SN-Thickener 636, SN-Thickener 641; SAN NOPCO Ltd.), and association type thickeners containing a polyoxyethylene chain (exemplary commercial names include SN-Thickener 625N and SN-Thickener 665T).

Examples of the dispersing agent include polyacrylic acid (salt), partially saponified polyvinyl alcohol, and sulfonated polyvinyl alcohol.

Examples of the antifreezing agent include ethylene glycol, propylene glycol, and glycerol.

Examples of the antiseptic include formalin and 5-chloro-2-methyl-4-isothiazolin-3-one.

Examples of the solvent include butylcellosolve, propylene glycol monopropyl ether, and 1-butanol.

The defoaming agent of the present invention can be produced by the following production processes (1) to (5), or the like.

<Production Process (1)>

Process (1) comprising step (1) of obtaining a solution by dissolving the fatty acid amide (A) while heating and stirring the fatty acid amide (A), a part of the base oil (B) that is liquid at 25° C., the oil thickening agent (C), and the surfactant (D), step (2) of obtaining a mixture by charging the solution to the rest of the base oil (B) that is liquid at 25° C. while stirring the base oil (B), and step (3) of obtaining the defoaming agent by subjecting the mixture to fining treatment (homogenizing treatment).

The heating-stirring temperature (° C.), which is not limited as long as the fatty acid amide (A) can be dissolved, is preferably 80 to 180, more preferably 90 to 160, particularly preferably 100 to 150, and most preferably 110 to 140.

In step (2), it is preferred to do heating and stirring also while charging the solution.

Although the lower the temperature of the rest of the base oil (B) is, the more preferable, it is preferred, from the viewpoint of defoaming property, production cost, and so on, to maintain the temperature at 10 to 67° C., more preferably at 11 to 55° C., particularly preferably at 12 to 46° C., and most preferably at 14 to 41° C.

While the fining treatment (homogenizing treatment) has no limitation as long as it can finely dispersing the fatty acid amide (A), it is preferred to perform the fining treatment (homogenizing treatment) by using an emulsification/dispersion machine (e.g., a bead mill, a Disper mill, a homogenizer, or a Gaulin homogenizer).

Regarding the oil thickening agent (C) and/or the surfactant (D), it is permissible to obtain a solution by dissolving the oil thickening agent (C) and/or the surfactant (D) together with the fatty acid amide (A) in step (1), and it is also permissible to obtain a solution by dissolving a part of the oil thickening agent (C) and/or the surfactant (D) together with the fatty acid amide (A) in step (1) and mix the remainder of the oil thickening agent (C) and/or the surfactant (D) with the rest of the base oil (B) in step (2), and it is also permissible to add the remainder of the oil thickening agent (C) and/or the surfactant (D) before and after the fining treatment (homogenizing treatment) of step (3).

When using the hydrophobic silica (F) and/or the polyether (G), these may be fed in any step.

When using a thickener, a dispersing agent, an antiseptic, an antifreezing agent, and/or a solvent, these may be fed in any step.

<Production Process (2)>

Process (2) comprising step (4) of obtaining a solution by dissolving the fatty acid amide (A) while heating and stirring the fatty acid amide (A), the base oil (B) that is liquid at 25° C., the oil thickening agent (C), the surfactant (D), and the water (E), and step (5) of obtaining the defoaming agent by subjecting the solution to fining treatment (homogenizing treatment) at 40° C. or lower after cooling and stirring the solution.

It is preferred to dissolve the fatty acid amide (A) under sealing by using a pressure-resistant container in step (1). Other conditions are the same as those of production process (1).

The cooling-stirring temperature, which should just be 40° C. or lower, is preferably 5 to 40° C., more preferably 10 to 38° C., and particularly preferably 20 to 35° C.

The higher the cooling rate is, the more preferable, and it is preferred to minimize thermal history at 45 to 90° C. (especially about 70° C.). If a thermal history within this temperature range is added, the crystal form of the fatty acid amide (A) may change to β form, so that the defoaming property may deteriorate. The particulars of the thermal history are common in other production methods.

<Production Process (3)>

Process (3) comprising step (6) of obtaining a solution by dissolving the fatty acid amide (A) while heating and stirring the fatty acid amide (A), the base oil (B) that is liquid at 25° C., the oil thickening agent (C), and the surfactant (D), step (7) of obtaining a mixture by charging the solution to the water (E) while stirring the water, and step (8) of obtaining the defoaming agent by subjecting the mixture to fining treatment (homogenizing treatment).

Although the lower the temperature of the water (E) is, the more preferable, it is preferred, from the viewpoint of defoaming property, production cost, and so on, to maintain the temperature at 10 to 60° C., more preferably at 14 to 50° C., particularly preferably at 20 to 45° C., and most preferably at 25 to 40° C.

Regarding the water (E), it is permissible to obtain a solution by using a part of the water (E) in step (6) together with the fatty acid amide (A) and so on and use the rest of the water (E) in step (7), and it is also permissible to add the rest of the water (E) before and after the fining treatment (homogenizing treatment) of step (8).

In the case of using a part of the water (E) in step (7), it is preferred to dissolve the fatty acid amide (A) under sealing by using a pressure-resistant container.

Other conditions are the same as those of production process (1).

<Production Process (4)>

Process (4) comprising step (9) of obtaining a solution by dissolving the fatty acid amide (A) while heating and stirring the fatty acid amide (A), the base oil (B) that is liquid at 25° C., the oil thickening agent (C), and the surfactant (D), and step (10) of obtaining the defoaming agent by subjecting the solution to fining treatment (homogenizing treatment) at 40° C. or lower after cooling and stirring the solution.

Other conditions are the same as those of production processes (1) to (3).

<Production Process (5)>

Process (5) comprising step (11) of obtaining a solution by dissolving the fatty acid amide (A) while heating and stirring the fatty acid amide (A), the base oil (B) that is liquid at 25° C., the oil thickening agent (C), the surfactant (D), and a part of the water (E), step (12) of obtaining a mixture by charging the solution to the rest of the water (E) while stirring the water, and step (13) of obtaining the defoaming agent by subjecting the mixture to fining treatment (homogenizing treatment).

Other conditions are the same as those of production processes (1) to (3).

The defoaming agent of the present invention is effective for an aqueous foamable liquid and can be used as, for example, a defoaming agent for paint (water-based paint and the like), and a defoaming agent for various production processes (a paper-making process, a fermentation process, a waste water treatment process, a monomer stripping process, a polymer polymerization process, and so on).

Among these, it is suited as a defoaming agent for paint, more suited as a defoaming agent for water-based paint, and it is best-suited as a defoaming agent for emulsion paint among water-based paints (paint for water-based building exterior decoration, paint for building interior decoration, water-based ink, paint of paper coating, and so on).

Examples of the binder contained in emulsion paint include vinyl acetate resin, acrylic resin, styrene resin, halogenated olefin resin, urethane resin, silicone resin, and fluorine atom-containing silicone resin, and it is effective for any one.

The method of adding the defoaming agent of the present invention may, in the case of applying it to paint, be a method to add it (1) at the time of pigment dispersion and/or (2) after paint preparation. Moreover, when applying it to various production processes, the method may be any of the methods to add it (1) at the same time as the feed of raw materials, (2) before heating and/or pressure reduction treatment, and/or (3) during a final finishing step or the like.

When applying to various production processes, the added amount (% by weight) of the defoaming agent of the present invention is preferably 0.0001 to 3, more preferably 0.001 to 2.7, particularly preferably 0.005 to 2.3, and most preferably 0.01 to 2 based on the weight of a foamable liquid (preferably an aqueous foamable liquid). When applying to paint, the added amount (% by weight) of the defoaming agent of the present invention is preferably 0.05 to 3, more preferably 0.1 to 2.7, particularly preferably 0.2 to 2.3, and most preferably 0.3 to 2.0 based on the weight of the paint.

Moreover, when applying to emulsion paint, which is best suited, the added amount (% by weight) of the defoaming agent of the present invention is preferably 0.05 to 3, more preferably 0.1 to 2.7, particularly preferably 0.2 to 2.3, and most preferably 0.3 to 2 based on the weight of the paint.

EXAMPLES

The present invention will be described below in more detail by examples, but the present invention is not limited to them. Unless otherwise stated, part(s) and % mean part(s) by weight and % by weight, respectively.

Example 1

In a container capable of being heated, stirred, and cooled, 30 parts of fatty acid amide (a1) {ethylene bis-stearylamide, ALFLOW H-50S, NOF Corporation, "ALFLOW" is a registered trademark of this company}, 300 parts of base oil (b1) {mineral oil, COSMO PURESPIN G, COSMO OIL LUBRICANTS CO., LTD.}, 40 parts of oil thickening agent (c1) {aluminum stearate, SA-1500, Sakai Chemical Industry Co., Ltd.}, 5 parts of surfactant (dn1) {polyoxyethylene diolate, IONET DO-600, Sanyo Chemical Industries, Ltd.}, 25 parts of surfactant (dn2) {polyoxyethylene alkylene ether, NARO-ACTY CL-40, Sanyo Chemical Industries, Ltd.}, 5 parts of surfactant (dn3) {sorbitan monooleate, IONET S-80, Sanyo Chemical Industries, Ltd.}, and 15 parts of surfactant (da1) {calcium dodecylbenzenesulfonate, TAYCAPOWER BC-2070M, Tayca Corporation, "TAYCAPOWER" is a registered trademark of this company} were brought up to 140° C. while being heated and stirred, and then heating and stirring were continued for additional 15 minutes at that temperature, so that amide solution (1) was obtained.

Subsequently, while 580 parts of base oil (b1) adjusted to 5° C. was cooled and stirred, the amide solution (1) was charged thereto (liquid temperature was 46° C.) and then was stirred for 15 minutes, so that mixture (1) was obtained.

The mixture (1) was subjected to agitation {fining treatment (homogenizing treatment)} at 4000 rpm for 15 minutes by using an EXCEL-AUTO HOMOGENIZER equipped with an impeller-type blade, so that defoaming agent (1) of the present invention was obtained.

The viscosity (25° C.) at a shear rate of 1000 s$^{-1}$ of defoaming agent (1) of the present invention was 0.46 Pa·s {a viscosity was measured while the shear rate was increased from 0.1 s$^{-1}$ to 1000 s$^{-1}$ over 300 seconds in a viscoelasticity analyzer MCR-301 manufactured by ANTONPAAR, using a cone plate (CP25-2; plate diameter: 25 mm, cone angle: 2°), and then a viscosity at a shear rate of 1000 s$^{-1}$ was read; the same is applied also hereinafter}.

The viscosity (25° C.) at a shear rate of 10 s$^{-1}$ of defoaming agent (1) of the present invention was 0.83 Pa·s {a viscosity was measured while the shear rate was increased from 0.1 s$^{-1}$ to 1000 s$^{-1}$ over 300 seconds in a viscoelasticity analyzer MCR-301 manufactured by ANTONPAAR, using a cone plate (CP25-2; plate diameter: 25 mm, cone angle: 2°), and then a viscosity at a shear rate of 10 s$^{-1}$ was read; the same is applied also hereinafter}.

Example 2

In a container capable of being heated, stirred, and cooled, 35 parts of fatty acid amide (a1), 835 parts of base oil (b2) {mineral oil, COSMO SP-10, COSMO OIL LUBRICANTS CO., LTD.}, 80 parts of oil thickening agent (c1), 5 parts of surfactant (dn1), 25 parts of surfactant (dn2), 5 parts of surfactant (dn3), 15 parts of surfactant (da1), and 4 parts of hydrophobic silica (f1) {Nipsil SS-100, Tosoh Silica Corporation} were brought up to 140° C. while being heated and stirred, and then heating and stirring were continued for additional 15 minutes at that temperature, so that amide solution (2) was obtained.

Subsequently, the amide solution (2) was cooled and stirred down to 40° C. or lower and was subjected to fining treatment (homogenizing treatment) at 40° C. or lower at 3500 psi (24.1 MPa) by using a Gaulin homogenizer, so that defoaming agent (2) of the present invention was obtained.

The viscosity (25° C.) at a shear rate of $1000 s^{-1}$ of defoaming agent (2) of the present invention was 0.82 Pa·s.

The viscosity (25° C.) at a shear rate of $10 s^{-1}$ of defoaming agent (2) of the present invention was 9.1 Pa·s.

Example 3

In a container capable of being heated, stirred, and cooled, 35 parts of fatty acid amide (a1), 300 parts of base oil (b1), 20 parts of oil thickening agent (c1), 2 parts of surfactant (dn1), 9 parts of surfactant (dn2), 2 parts of surfactant (dn3), and 5 parts of surfactant (da1) were brought up to 140° C. while being heated and stirred, and then heating and stirring were continued for additional 15 minutes at that temperature, so that amide solution (3) was obtained.

Subsequently, while 627 parts of base oil (b1) adjusted to 5° C. was cooled and stirred, the amide solution (3) was charged thereto (liquid temperature was 41° C.) and then was stirred for 15 minutes, so that mixture (3) was obtained.

The mixture (3) was subjected to fining treatment (homogenizing treatment) at 3500 psi (24.1 MPa) by using a Gaulin homogenizer, so that defoaming agent (3) of the present invention was obtained.

The viscosity (25° C.) at a shear rate of $1000 s^{-1}$ of defoaming agent (3) of the present invention was 0.22 Pa·s.

The viscosity (25° C.) at a shear rate of $10 s^{-1}$ of defoaming agent (3) of the present invention was 0.41 Pa·s.

Example 4

In a container capable of being heated, stirred, and cooled, 80 parts of fatty acid amide (a2) {erucic acid monoamide, ALFLOW P-10, NOF Corporation}, 300 parts of base oil (b1), 15 parts of oil thickening agent (c1), 6 parts of surfactant (dn1), 30 parts of surfactant (dn2), 6 parts of surfactant (dn4) {glycerol monostearate, MONOGLY SD, NOF Corporation}, 18 parts of surfactant (da1), and 47 parts of hydrophobic silica (f1) were brought up to 140° C. while being heated and stirred, and then heating and stirring were continued for additional 15 minutes at that temperature, so that amide solution (4) was obtained.

Subsequently, while 545 parts of base oil (b1) adjusted to 5° C. was cooled and stirred, the amide solution (4) was charged thereto (liquid temperature was 46° C.) and then was stirred for 15 minutes, so that mixture (4) was obtained.

The mixture (4) was subjected to fining treatment (homogenizing treatment) at 3500 psi (24.1 MPa) by using a Gaulin homogenizer, so that defoaming agent (4) of the present invention was obtained.

The viscosity (25° C.) at a shear rate of $1000 s^{-1}$ of defoaming agent (4) of the present invention was 0.22 Pa·s.

Example 5

In a container capable of being heated, stirred, and cooled, 35 parts of fatty acid amide (a3) {ethylene bis-oleylamide, ALFLOW AD-281F, NOF Corporation}, 600 parts of base oil (b3) {vegetable oil, FINE OIL N, Miyoshi Oil & Fat Co., Ltd.}, 4 parts of oil thickening agent (c2) {12-hydroxystearic acid, 12-hydroacid, and Kokura Synthetic Industries, Ltd.}, 4 parts of surfactant (dn1), 20 parts of surfactant (dn2), 4 parts of surfactant (dn3), and 12 parts of surfactant (da1) were brought up to 140° C. while being heated and stirred, and then heating and stirring were continued for additional 15 minutes at that temperature, so that amide solution (5) was obtained.

Subsequently, the amide solution (5) was charged to 321 parts of base oil (b3) adjusted to 5° C. under cooling and stirring (liquid temperature was 67° C.), followed by stirring for 15 minutes after the addition of 53 parts of polyether (g1) {polyoxypropylene dibutyl ether, NEWPOL LB-1715, Sanyo Chemical Industries, Ltd.}, so that mixture (5) was obtained.

The mixture (5) was subjected to agitation {fining treatment (homogenizing treatment)} with an EXCEL-AUTO HOMOGENIZER at 4000 rpm for 15 minutes, so that defoaming agent (5) of the present invention was obtained.

The viscosity (25° C.) at a shear rate of $1000 s^{-1}$ of defoaming agent (5) of the present invention was 0.15 Pa·s.

Example 6

Twenty-five parts of fatty acid amide (a3), 955 parts of base oil (b2), 10 parts of oil thickening agent (c3) {N-lauroyl-glutamic acid dibutylamide, GP-1, Ajinomoto Co., Inc.}, 3 parts of surfactant (dn1), 3 parts of surfactant (dn2), and 4 parts of surfactant (da1) were brought up to 140° C. while being heated and stirred, and then heating and stirring were continued for additional 15 minutes at that temperature, so that amide solution (6) was obtained.

Subsequently, the amide solution (6) was cooled and stirred down to 40° C. or lower and was subjected to fining treatment (homogenizing treatment) at 40° C. or lower at 3500 psi (24.1 MPa) by using a Gaulin homogenizer, so that defoaming agent (6) of the present invention was obtained.

The viscosity (25° C.) at a shear rate of $1000 s^{-1}$ of defoaming agent (6) of the present invention was 0.18 Pa·s.

Example 7

Ten parts of fatty acid amide (a1), 800 parts of base oil (b2), 100 parts of oil thickening agent (c1), 9 parts of surfactant (dn1), 45 parts of surfactant (dn2), 9 parts of surfactant (dn3), and 27 parts of surfactant (da1) were brought up to 140° C. while being heated and stirred, and then heating and stirring were continued for additional 15 minutes at that temperature, so that amide solution (7) was obtained.

Subsequently, the amide solution (7) was cooled and stirred down to 40° C. or lower and then it was subjected to fining treatment (homogenizing treatment) at 40° C. or lower at 3500 psi (24.1 MPa) by using a Gaulin homogenizer after the addition of 538 parts of polyether (g1), so that defoaming agent (7) of the present invention was obtained.

The viscosity (25° C.) at a shear rate of $1000 s^{-1}$ of defoaming agent (7) of the present invention was 0.54 Pa·s.

Example 8

In a pressure-resistant hermetic container capable of being heated, stirred, and cooled, 35 parts of fatty acid amide (a1), 870 parts of base oil (b2), 40 parts of oil thickening agent (c1), 5 parts of surfactant (dn1), 25 parts of surfactant (dn2), 8 parts of surfactant (dn3), and 2 parts of surfactant (dn5) {polyoxyethylene sorbitan monooleate, NONION OT-221, produced by NOF Corporation), 15 parts of surfactants (da1), and 250 parts of water (e1) {tap water} were brought up to 140° C. while being heated and stirred, and then heating and stirring were continued at that temperature for additional 15 minutes, so that amide solution (8) was obtained.

Subsequently, the resulting amide solution (8) was cooled to 40° C. or lower, followed by the addition of 0.5 parts of antiseptic (BS-200), stirring for 15 minutes, and further fining treatment (homogenizing treatment) at 3500 psi (24.1 MPa) using a Gaulin Homogenizer, so that defoaming agent (8) of the present invention was obtained.

<Viscosity at a Shear Rate of 1000 $s^{-1}$ of the Oil Phase of Defoaming Agent (8)>

The oil phase of defoaming agent (8) of the present invention was obtained by obtaining amide solution (8') in the same manner as described above except for failing to use 250 parts of water (e1), and then operating in the same manner as described above. The viscosity (25° C.) at a shear rate of 1000 $s^{-1}$ of the oil phase of defoaming agent (8) of the present invention was 0.46 Pa·s.

The viscosity (25° C.) at a shear rate of 10 $s^{-1}$ of the oil phase of defoaming agent (8) of the present invention was 0.78 Pa·s.

Example 9

In a container capable of being heated, stirred, and cooled, 100 parts of fatty acid amide (a1), 825 parts of base oil (b1), 20 parts of oil thickening agent (c1), 5 parts of surfactant (dn1), 25 parts of surfactant (dn2), 8 parts of surfactant (dn3), and 15 parts of surfactant (da1), and 2.0 parts of surfactant (da1) {sodium dodecyldiphenylethersulfonate, PELEX SS-L, produced by Kao Corporation, "PELEX" is a registered trademark of this company) were brought up to 140° C. while being heated and stirred, and then heating and stirring were continued at that temperature for additional 15 minutes, so that amide solution (9) was obtained.

Subsequently, the amide solution (9) was charged to 3000 parts of water (e1) adjusted to 5° C. under cooling and stirring (liquid temperature was 14° C.), and after the addition of 3 parts of an antiseptic {BS-200}, agitation was done for 15 minutes, so that mixture (9) was obtained.

The mixture (9) was subjected to fining treatment (homogenizing treatment) at 3500 psi (24.1 MPa) by using a Gaulin homogenizer, so that defoaming agent (9) of the present invention was obtained.

<Viscosity at a Shear Rate of 1000 $s^{-1}$ of the Oil Phase of Defoaming Agent (9)>

The amide solution (9) of 140° C. was charged into a stainless steel container cooled to 5° C. or lower (the solution was added slowly under stirring and cooling so that the temperature of the charged solution would not become 14° C. or higher), so that mixture (9') was obtained. Then the mixture (9') was subjected to fining treatment (homogenizing treatment) at 3500 psi (24.1 MPa) by using a Gaulin homogenizer, so that an oil phase of defoaming agent (9) of the present invention was obtained. The viscosity (25° C.) at a shear rate of 1000 $s^{-1}$ of the oil phase of defoaming agent (9) of the present invention was 0.37 Pa·s.

Example 10

In a pressure-resistant hermetic container capable of being heated, stirred, and cooled, 35 parts of fatty acid amide (a1), 855 parts of base oil (b1), 60 parts of oil thickening agent (c1), 5 parts of surfactant (dn1), 25 parts of surfactant (dn2), 5 parts of surfactant (dn3), 15 parts of surfactant (da1), and 909 parts of water (e1) were brought up to 140° C. while being heated and stirred, and then heating and stirring were continued for additional 15 minutes at that temperature, so that amide solution (10) was obtained.

Subsequently, the amide solution (10) was charged to 182 parts of water (e1) adjusted to 5° C. under cooling and stirring (it was added slowly so that the temperature of the water would not become 40° C. or higher), and after the addition of 1 part of an antiseptic {BS-200}, agitation was done for 15 minutes, so that defoaming agent (10) of the present invention was obtained.

<Viscosity at a Shear Rate of 1000 $s^{-1}$ of the Oil Phase of Defoaming Agent (10)>

Amide solution (10') was prepared in the same manner as that described above except for failing to use 909 parts and 182 parts of water (e1), and then the amide solution (10') was charged into a stainless steel container cooled to 5° C. or lower (the solution was added slowly under stirring and cooling so that the temperature of the charged solution would not become 40° C. or higher) and was further stirred for 15 minutes, so that an oil phase of defoaming agent (10) of the present invention was obtained. The viscosity (25° C.) at a shear rate of 1000 $s^{-1}$ of the oil phase of defoaming agent (10) of the present invention was 0.70 Pa·s.

The viscosity (25° C.) at a shear rate of 10 $s^{-1}$ of the oil phase of defoaming agent (10) of the present invention was 5.3 Pa·s.

Example 11

In a pressure-resistant hermetic container capable of being heated, stirred, and cooled, 980 parts of water (e1) and 20 parts of polyvinyl alcohol {KURARAY POVAL PVA-205, produced by Kuraray Co., Ltd.} were brought up to 90° C. under heating and stirring, and stirring was continued until the polyvinyl alcohol dissolved completely, so that aqueous solution (11) was obtained. To the aqueous solution (11) were added 35 parts of fatty acid amide (a4) {stearic acid amide, AMIDE AP-1, Nippon Kasei Chemical Co., Ltd.}, 855 parts of base oil (b1), 60 parts of oil thickening agent (c1), 5 parts of surfactant (dn1), 25 parts of surfactant (dn2), 5 parts of surfactant (dn3), and 15 parts of surfactant (da1), and then the temperature was increased to 140° C. while heating and stirring, and heating and stirring were continued for additional 15 minutes at that temperature, so that amide solution (11) was obtained.

Subsequently, the amide solution (11) was cooled and stirred down to 40° C. or lower and then it was subjected to fining treatment (homogenizing treatment) at 40° C. or lower at 3500 psi (24.1 MPa) by using a Gaulin homogenizer after the addition of 1 part of an antiseptic {BS-200}, so that defoaming agent (11) of the present invention was obtained.

<Viscosity at a Shear Rate of 1000 $s^{-1}$ of the Oil Phase of Defoaming Agent (11)>

Amide solution (11') was prepared in the same manner as that described above except for failing to use 980 parts of water (e1) and 20 parts of polyvinyl alcohol, and the amide solution (11') was charged into a stainless steel container cooled to 5° C. or lower (the solution was added slowly under stirring and cooling so that the temperature of the charged solution would not become 40° C. or higher). After further stirring for 15 minutes, fining treatment (homogenizing treatment) was done at 3500 psi (24.1 MPa) by using a Gaulin homogenizer, so that an oil phase of defoaming agent (11) of the present invention was obtained. The viscosity (25° C.) at a shear rate of 1000 $s^{-1}$ of the oil phase of defoaming agent (11) of the present invention was 0.61 Pa·s.

The viscosity (25° C.) at a shear rate of 10 s$^{-1}$ of the oil phase of defoaming agent (11) of the present invention was 6.2 Pa·s.

Examples 12 to 14

Polyether compounds were added to 1000 parts of defoaming agent (1) as shown in Table 1, followed by stirring uniformly, so that defoaming agents (12) to (14) of the present invention were obtained.

The viscosities (25° C.) at a shear rate of 1000 s$^{-1}$ of the defoaming agents (12) to (14) of the present invention are shown in Table 1.

The compositions of the polyether compounds (g1) to (g5) given in the table are as follows.
(g1) Polyoxypropylene butyl ether, NEWPOL LB-1715, produced by Sanyo Chemical Industries, Ltd., HLB=0
(g2) Polyoxypropylene butyl ether, NEWPOL LB-625, produced by Sanyo Chemical Industries, Ltd., HLB=0
(g3) Polyoxyethylene polyoxypropylene trimethylolpropane, NEWPOL TL-4500N, produced by Sanyo Chemical Industries, Ltd., HLB=2.0
(g4) Polyoxyethylene polyoxypropylene glycol, NEWPOL PE-61, produced by Sanyo Chemical Industries, Ltd, HLB=2.2
(g5) Polyoxypropylene glycol, NEWPOL PP-2000, produced by Sanyo Chemical Industries, Ltd., HLB=0

TABLE 1

| | | Example | | |
|---|---|---|---|---|
| | | 12 | 13 | 14 |
| Polyether compound | g 1 | 60 | | |
| | g 2 | 180 | | |
| | g 3 | 20 | | |
| | g 4 | | 150 | |
| | g 5 | | | 200 |
| Viscosity (Pa · s) | | 0.39 | 0.35 | 0.24 |

Example 15

In a container capable of being heated, stirred, and cooled, 35 parts of fatty acid amide (a1), 277 parts of base oil (b1), 40 parts of oil thickening agent (c4) {calcium stearate, CALCIUM STEARATE, NOF Corporation}, 20 parts of surfactant (dn3), and 20 parts of surfactant (da1) were brought up to 120° C. while being heated and stirred, and then heating and stirring were continued for additional 15 minutes at that temperature, so that amide solution (15) was obtained.

Subsequently, while 608 parts of base oil (b1) adjusted to 20° C. was cooled and stirred, the amide solution (15) was charged thereto (liquid temperature was 76° C.) and then was stirred for 15 minutes, so that mixture (15) was obtained.

The mixture (15) was subjected to fining treatment (homogenizing treatment) at 3500 psi (24.1 MPa) by using a Gaulin homogenizer, so that defoaming agent (15) of the present invention was obtained.

The viscosity (25° C.) at a shear rate of 1000 s$^{-1}$ of defoaming agent (15) of the present invention was 0.28 Pa·s.

The viscosity (25° C.) at a shear rate of 10 s$^{-1}$ of the oil phase of defoaming agent (15) of the present invention was 8.7 Pa·s.

Example 16

Defoaming agent (16) of the present invention was obtained in the same manner as in Example 15 except for exchanging the oil thickening agent (c4) for oil thickening agent (c5) {zinc laurate, POWDER BASE L, produced by NOF Corporation}. The viscosity (25° C.) at a shear rate of 1000 s$^{-1}$ of defoaming agent (16) of the present invention was 0.11 Pa·s.

The viscosity (25° C.) at a shear rate of 10 s$^{-1}$ of the oil phase of defoaming agent (16) of the present invention was 0.9 Pa·s.

Example 17

Defoaming agent (17) of the present invention was obtained in the same manner as in Example 15 except for exchanging the oil thickening agent (c4) for oil thickening agent (c6) {zinc stearate, ZINC STEARATE, produced by NOF Corporation}. The viscosity (25° C.) at a shear rate of 1000 s$^{-1}$ of defoaming agent (17) of the present invention was 0.18 Pa·s.

The viscosity (25° C.) at a shear rate of 10 s$^{-1}$ of the oil phase of defoaming agent (17) of the present invention was 3.7 Pa·s.

Example 18

Defoaming agent (18) of the present invention was obtained in the same manner as in Example 15 except for exchanging the oil thickening agent (c4) for oil thickening agent (c7) {zinc behenate, ZINC BEHENATE, produced by NOF Corporation}. The viscosity (25° C.) at a shear rate of 1000 s$^{-1}$ of defoaming agent (18) of the present invention was 0.15 Pa·s.

The viscosity (25° C.) at a shear rate of 10 s$^{-1}$ of the oil phase of defoaming agent (18) of the present invention was 2.5 Pa·s.

Example 19

Defoaming agent (19) of the present invention was obtained in the same manner as in Example 15 except for exchanging the oil thickening agent (c4) for oil thickening agent (c8) {magnesium stearate, MAGNESIUM STEARATE, produced by NOF Corporation}. The viscosity (25° C.) at a shear rate of 1000 s$^{-1}$ of defoaming agent (19) of the present invention was 0.14 Pa·s.

The viscosity (25° C.) at a shear rate of 10 s$^{-1}$ of the oil phase of defoaming agent (19) of the present invention was 1.6 Pa·s.

Example 20

Defoaming agent (20) of the present invention was obtained in the same manner as in Example 15 except for exchanging 40 parts of the oil thickening agent (c4) for 20 parts of oil thickening agent (c9) {castor oil fatty acid calcium, CALCIUM CASTOR STEARATE, produced by NOF Corporation} and 277 parts of the base oil (b1) for 297 parts of this. The viscosity (25° C.) at a shear rate of 1000 s$^{-1}$ of defoaming agent (20) of the present invention was 0.19 Pa·s.

The viscosity (25° C.) at a shear rate of 10 s$^{-1}$ of the oil phase of defoaming agent (20) of the present invention was 4.7 Pa·s.

Comparative Example 1

In a container capable of being heated, stirred, and cooled, 50 parts of fatty acid amide (a1), 300 parts of base oil (b1), and 40 parts of oil thickening agent (c1) were brought up to 140°

C. while being heated and stirred, and then heating and stirring were continued at that temperature for additional 15 minutes, so that amide solution (H1) was obtained. Subsequently, the amide solution (H1) was charged into 610 parts of base oil (b2) adjusted to 5° C. under cooling and stirring (liquid temperature was 44° C.), followed by stirring for 15 minutes, so that mixture (H1) was obtained. When the solution (H1) was charged into the base oil (b2), it solidified instantly and was in a heterogeneous state even after the 15-minute stirring (liquid temperature was 44° C.). The mixture (H1) was stirred with an EXCEL-AUTO HOMOGENIZER at 4000 rpm for 15 minutes and then was filtered through a 100-mesh stainless steel screen to remove remaining lumps, so that defoaming agent (H1) for comparison was obtained.

The viscosity (25° C.) at a shear rate of 1000 s$^{-1}$ of the defoaming agent (H1) for comparison was 0.02 Pa·s.

Comparative Example 2

In a container capable of being heated, stirred, and cooled, 13 parts of fatty acid amide (a1), 300 parts of base oil (b2), and 5 parts of oil thickening agent (c1) were brought up to 140° C. while being heated and stirred, and then heating and stirring were continued at that temperature for additional 15 minutes, so that amide solution (H2) was obtained. Subsequently, the amide solution (H2) was charged into 682 parts of base oil (b2) adjusted to 5° C. under cooling and stirring (liquid temperature was 42° C.), followed by stirring for 15 minutes, so that mixed liquid (H2) was obtained. The mixed liquid (H2) was stirred at 4000 rpm for 15 minutes by using an EXCEL-AUTO HOMOGENIZER equipped with an impeller-type blade, so that defoaming agent (H2) for comparison was obtained.

The viscosity (25° C.) at a shear rate of 1000 s$^{-1}$ of the defoaming agent (H2) for comparison was 0.05 Pa·s.

Comparative Example 3

In a container capable of being heated, stirred, and cooled, 35 parts of fatty acid amide (a1), 300 parts of base oil (b1), 40 parts of oil thickening agent (c1), 15 parts of surfactant (dn1), 50 parts of surfactant (dn2), 15 parts of surfactant (dn3), and 30 parts of surfactant (da1) were brought up to 140° C. while being heated and stirred, and then heating and stirring were continued for additional 15 minutes at that temperature, so that amide solution (H3) was obtained. Subsequently, the amide solution (H3) was charged into 515 parts of base oil (b1) adjusted to 5° C. under cooling and stirring (liquid temperature was 46° C.), followed by stirring for 15 minutes, so that mixed liquid (H3) was obtained. The mixed liquid (H3) was subjected to fining treatment (homogenizing treatment) at 3500 psi (24.1 MPa) by using a Gaulin homogenizer, so that defoaming agent (H3) for comparison was obtained. The viscosity (25° C.) at a shear rate of 1000 s$^{-1}$ of the defoaming agent (H3) for comparison was 0.06 Pa·s.

Comparative Example 4

In a container capable of being heated, stirred, and cooled, 15 parts of fatty acid amide (a1), 355 parts of base oil (b2), 20 parts of magnesium stearate {MAGNESIUM STEARATE G, NOF Corporation}, and 370 parts of bis(2-ethylhexyl) maleate {Junsei Chemical Co., Ltd.} were brought up to 140° C. while being heated and stirred, and then heating and stirring were continued for additional 15 minutes at that temperature, so that amide solution (H4) was obtained. Subsequently, the resulting amide solution (H4) was cooled to 45° C., and then 120 parts of Tween 65 {polyoxyethylene sorbitan tristearic acid ester, Croda Japan KK} and 120 parts of Phosphorane PNP9 {nonylphenol ethoxylate phosphate ester, Akzo Nobel, Inc.} were added thereto, followed by cooling under stirring, so that defoaming agent (H4) for comparison was obtained.

The viscosity (25° C.) at a shear rate of 1000 s$^{-1}$ of the defoaming agent (H4) for comparison was 0.06 Pa·s.

Using the defoaming agents (1) to (20) and (H1) to (H4) obtained in Examples 1 to 20 and Comparative Examples 1 to 4, defoaming property to the emulsion paints prepared in the manner described below was evaluated, and the evaluation results are shown in Table 3.

(1) Preparation of Emulsion Base Paint

Grinding and letting down were performed with the following raw material compositions by using an EXCEL-AUTO HOMOGENIZER (Nihonseiki Co., Ltd., Model ED) equipped with an impeller-type blade to form paints. The resulting paints were diluted with water so as to be 80 KU (25° C.) as measured with a Stormer viscometer (JIS K5600-2-2, corresponding International Standard ISO2431-1993; Paints and varnishes—Determination of flow time by use of flow cups), so that emulsion base paints were obtained.

TABLE 2

| | | | |
|---|---|---|---|
| Grinding step | Water | 8.2 parts | |
| | SN-Dispersant 5027 | 1.2 parts | Note 1 |
| | SN-Thickener 636 | 0.5 parts | Note 2 |
| | Aqueous ammonia solution (25%) | 0.2 parts | |
| | Ethylene glycol | 3.4 parts | |
| | TIPAQUE R930 | 27.8 parts | Note 3 |
| Letdown step | ACRONAL1 295DN | 55.5 parts | Note 4 |
| | NOPCOCIDE SN215 | 1.0 part | Note 5 |
| | TEXANOL | 2.0 parts | Note 6 |
| | SN-Thickener 636 | 0.2 parts | Note 7 |
| Total | | 100.0 parts | |

Note 1:
A dispersing agent produced by SAN NOPCO Ltd.
Note 2:
A thickener produced by SAN NOPCO Ltd.
Note 3:
Titanium dioxide produced by Ishihara Sangyo Kaisha, Ltd.
Note 4:
An acrylic emulsion produced by BASF A.G.; "ACRONAL" is a registered trademark of BASF Aktiengesellschaft.
Note 5:
An antiseptic produced by SAN NOPCO Ltd.
Note 6:
Film conditioner produced by Eastman Chemical Co.; "Texanol" is a registered trademark of YOSHIMURA OIL CHEMICAL Co., Ltd.

(2) Preparation of Emulsion Paint

A sample to be evaluated (a defoaming agent) was added to the emulsion base paint in an amount of 0.5% by weight (relative to the emulsion base paint; when the sample to be evaluated (the defoaming agent) contains water, the weight of components other than water is adjusted to 0.5% by weight relative to the emulsion base paint), followed by stirring at 25° C. at 5000 rpm for 5 minutes by using an EXCEL-AUTO HOMOGENIZER equipped with an impeller-type blade, so that emulsion paints (1) to (24) were obtained.

(3) Evaluation of Defoaming Property and Repelling

A tin plate {0.5 mm in thickness, having been cut into 20 cm×30 cm} was degreased with acetone/cloth and then emulsion paints (1) to (24) were applied thereto with a roller so that the wetted film thickness is 250 μm and thereafter were dried for one day in a controlling room conditioned to 25° C. and a relative humidity of 60%. Then, the surfaces of the paint films were observed and defoaming property (initial) and repelling (initial) were evaluated acconrding to the following standards.

Moreover, the emulsion paints (1) to (24) were stored each separately in a hermetic sample container at rest at 40° C. for one month, and then were stirred and mixed again at 25° C., 5000 rpm for 5 minutes by using an EXCEL-AUTO HOMOGENIZER equipped with an impeller-type blade, so that emulsion paints for aging evaluation were obtained and their defoaming property (defoaming durability) and repelling (after aging) were evaluated in the same manner.

<Defoaming Property>
5: There are up to foam marks.
4: There are five to ten foam marks.
3: There are 10 to 20 foam marks.
2: There are 20 to 30 foam marks.
1: There are 30 or more foam marks.

<Repelling>
5: There are up to two marks of repelling or cratering.
4: There are two to five marks of repelling or cratering.
3: There are five to ten marks of repelling or cratering.
2: There are 10 to 20 marks of repelling or cratering.
1: There are 20 or more marks of repelling or cratering.

TABLE 3

|  |  |  | Defoaming property |  | Repelling |  |
|---|---|---|---|---|---|---|
|  |  | Emulsion paint | Initial | Defoaming durability | Initial | After aging |
| Example | 1 | 1 | 5 | 4 | 5 | 5 |
|  | 2 | 2 | 4 | 4 | 5 | 5 |
|  | 3 | 3 | 4 | 4 | 5 | 5 |
|  | 4 | 4 | 5 | 5 | 5 | 5 |
|  | 5 | 5 | 4 | 4 | 5 | 5 |
|  | 6 | 6 | 4 | 4 | 5 | 5 |
|  | 7 | 7 | 5 | 5 | 5 | 5 |
|  | 8 | 8 | 5 | 5 | 5 | 5 |
|  | 9 | 9 | 4 | 4 | 5 | 5 |
|  | 10 | 10 | 5 | 5 | 5 | 5 |
|  | 11 | 11 | 5 | 4 | 5 | 5 |
|  | 12 | 12 | 5 | 5 | 5 | 5 |
|  | 13 | 13 | 4 | 3 | 5 | 5 |
|  | 14 | 14 | 5 | 4 | 5 | 5 |
|  | 15 | 15 | 5 | 4 | 5 | 5 |
|  | 16 | 16 | 4 | 4 | 5 | 5 |
|  | 17 | 17 | 4 | 4 | 5 | 5 |
|  | 18 | 18 | 4 | 3 | 5 | 5 |
|  | 19 | 19 | 4 | 3 | 5 | 5 |
|  | 20 | 20 | 4 | 4 | 5 | 5 |
| Comparative Example | 1 | 21 | 1 | 1 | 5 | 5 |
|  | 2 | 22 | 3 | 1 | 5 | 5 |
|  | 3 | 23 | 2 | 1 | 5 | 5 |
|  | 4 | 24 | 2 | 1 | 5 | 5 |

The emulsion paints using the defoaming agents of the present invention were very superior in (initial, defoaming durability) to those using the defoaming agents for comparison.

INDUSTRIAL APPLICABILITY

While the defoaming agent of the present invention can be used for all applications, it is effective for aqueous foamable liquid and can be applied to foams that generate during various steps of industries in which various aqueous foamable solutions are handled, such as the paper pulp manufacturing industry or its paper-making step, the construction industry or its sheet making step, the dyestuff industry, the dyeing industry, the fermentation industry, the synthetic resin manufacturing industry, the synthetic rubber manufacturing industry, ink, the paint industry, and the fiber processing industry.

The invention claimed is:

1. A defoaming agent comprising a fatty acid amide (A), a base oil (B) that is liquid at 25° C., at least one oil thickening agent (C) selected from the group consisting of salts of a fatty acid having 12 to 22 carbon atoms with a metal, hydroxycarboxylic acids, amino acid gelatinizers, polyglycerol fatty acid esters, (modified) polyalkylene waxes, and alkyl (meth)acrylate copolymers, and a surfactant (D) selected from the group consisting of sorbitan fatty acid esters, monoglycerol aliphatic acid esters and calcium dodecylbenzensulfonate, wherein the content of the fatty acid amide (A) is 1 to 10% by weight, the content of the base oil (B) that is liquid at 25° C. is 71 to 97% by weight, the content of the oil thickening agent (C) is 0.4 to 10% by weight, and the content of the surfactant (D) is 1 to 9% by weight based on the weight of the fatty acid amide (A), the base oil (B) that is liquid at 25° C., the oil thickening agent (C), and the surfactant (D), and the viscosity (25° C.) at a shear rate of 1000 s$^{-1}$ is 0.1 to 1.0 Pa·s.

2. The defoaming agent according to claim 1, wherein the fatty acid amide (A) is a reaction product of an alkylene diamine having 1 to 6 carbon atoms and a fatty acid having 10 to 22 carbon atoms and/or a reaction product of an alkylamine having 1 to 22 carbon atoms and a fatty acid having 10 to 22 carbon atoms.

3. The defoaming agent according to claim 1, wherein the kinematic viscosity at 40° C. of the base oil (B) that is liquid at 25° C. is 5 to 40 mm$^2$/s.

4. The defoaming agent according to claim 1, wherein the oil thickening agent (C) are salts of a fatty acid having 12 to 22 carbon atoms with a metal.

5. The defoaming agent according to claim 1, wherein the surfactant (D) comprises one or more nonionic surfactants.

6. The defoaming agent according to claim 1, wherein the surfactant (D) is composed of a mixture of one or more nonionic surfactants and one or more anionic surfactant.

7. The defoaming agent according to claim 1 further comprising water (E), wherein the content of the water (E) is 1 to 900% by weight based on the weight of the oil phase constituted of the fatty acid amide (A), the base oil (B) that is liquid at 25° C., the oil thickening agent (C), and the surfactant (D), and the viscosity (25° C.) at a shear rate of 1000 s$^{-1}$ of the oil phase containing no water (E) is 0.1 to 1.0 Pa·s.

8. The defoaming agent according to claim 1 further comprising hydrophobic silica (F), wherein the content of the hydrophobic silica (F) is 0.1 to 6% by weight based on the weight of the fatty acid amide (A), the base oil (B) that is liquid at 25° C., the oil thickening agent (C), and the surfactant (D).

9. The defoaming agent according to claim 1 further comprising polyether (G), wherein the content of the polyether (G) is 0.1 to 55% by weight based on the weight of the fatty acid amide (A), the base oil (B) that is liquid at 25° C., the oil thickening agent (C), and the surfactant (D).

10. A method for producing the defoaming agent according to claim 1, wherein the method comprises
process (1) comprising step (1) of obtaining a solution by dissolving the fatty acid amide (A) while heating and stirring the fatty acid amide (A), a part of the base oil (B) that is liquid at 25° C., the oil thickening agent (C), and the surfactant (D),
step (2) of obtaining a mixture by charging the solution to the rest of the base oil (B) that is liquid at 25° C. while stirring the base oil, and
step (3) of obtaining the defoaming agent by subjecting the mixture to fining treatment (homogenizing treatment);

process (2) comprising step (4) of obtaining a solution by dissolving the fatty acid amide (A) while heating and stirring the fatty acid amide (A), the base oil (B) that is liquid at 25° C., the oil thickening agent (C), the surfactant (D), and the water (E), and step (5) of obtaining the defoaming agent by subjecting the solution to fining treatment (homogenizing treatment) by cooling and stirring the solution at 40° C. or lower;

process (3) comprising step (6) of obtaining a solution by dissolving the fatty acid amide (A) while heating and stirring the fatty acid amide (A), the base oil (B) that is liquid at 25° C., the oil thickening agent (C), and the surfactant (D), step (7) of obtaining a mixture by charging the solution to the water (E) while stirring the water, and step (8) of obtaining the defoaming agent by subjecting the mixture to fining treatment (homogenizing treatment);

process (4) comprising step (9) of obtaining a solution by dissolving the fatty acid amide (A) while heating and stirring the fatty acid amide (A), the base oil (B) that is liquid at 25° C., the oil thickening agent (C), and the surfactant (D), and step (10) of obtaining the defoaming agent by subjecting the solution to fining treatment (homogenizing treatment) by cooling and stirring the solution at 40° C. or lower; or process (5) comprising step (11) of obtaining a solution by dissolving the fatty acid amide (A) while heating and stirring the fatty acid amide (A), the base oil (B) that is liquid at 25° C., the oil thickening agent (C), the surfactant (D), and a part of the water (E), step (12) of obtaining a mixture by charging the solution to the rest of the water (E) while stirring the water, and step (13) of obtaining the defoaming agent by subjecting the mixture to fining treatment (homogenizing treatment).

11. A water-based paint comprising a resin emulsion, a pigment, an aqueous medium, and the defoaming agent according to claim 1.

* * * * *